US011749115B2

(12) United States Patent
Fowe et al.

(10) Patent No.: US 11,749,115 B2
(45) Date of Patent: Sep. 5, 2023

(54) METHOD, APPARATUS, AND COMPUTER PROGRAM PRODUCT FOR DYNAMIC DETECTION OF PEDESTRIAN ACTIVITY

(71) Applicant: HERE GLOBAL B.V., Eindhoven (NL)

(72) Inventors: James Adeyemi Fowe, Chicago, IL (US); Bruce Bernhardt, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/550,425

(22) Filed: Dec. 14, 2021

(65) Prior Publication Data

US 2023/0186770 A1 Jun. 15, 2023

(51) Int. Cl.
*G08G 1/16* (2006.01)
*G06V 40/10* (2022.01)
*H04W 4/90* (2018.01)
*G06V 20/58* (2022.01)
*H04W 4/46* (2018.01)
*H04W 4/02* (2018.01)

(52) U.S. Cl.
CPC ........... *G08G 1/166* (2013.01); *G06V 20/58* (2022.01); *G06V 40/10* (2022.01); *G08G 1/16* (2013.01); *G08G 1/161* (2013.01); *H04W 4/46* (2018.02); *H04W 4/90* (2018.02); *H04W 4/02* (2013.01)

(58) Field of Classification Search
CPC .......... B60Q 1/52; B60Q 1/525; B60R 21/34; B60W 30/095; B60W 50/06; B60W 60/00; B60W 60/001; G06K 9/00; G06K 9/62; G06Q 30/02; G06Q 30/0251; G06Q 30/0261; H04W 4/02
See application file for complete search history.

(56) References Cited

U.S. PATENT DOCUMENTS 7,427,929 B2 9/2008 Bauer et al.
9,718,405 B1 8/2017 Englander et al.
(Continued)

FOREIGN PATENT DOCUMENTS

KR 101454127 10/2014

OTHER PUBLICATIONS

NPL search.*
(Continued)

*Primary Examiner* — Van T Trieu
(74) *Attorney, Agent, or Firm* — Jeffrey R. Moisan; HERE GLOBAL B.V.

(57) ABSTRACT

A method, apparatus, and computer program product are provided for dynamically detecting pedestrian activity. The method includes receiving one or more data objects from a vehicle. The one or more data objects may be processed using an image processing model to determine one or more pedestrian parameters. The method further includes determining whether the one or more pedestrian parameters satisfy one or more pedestrian parameter thresholds. In an instance the one or more pedestrian parameters do not satisfy the one or more pedestrian parameter thresholds, the method further includes causing a safety alert warning to be provided to one or more other vehicles. Corresponding apparatuses and computer program products are also provided.

12 Claims, 5 Drawing Sheets

(56) References Cited

U.S. PATENT DOCUMENTS

| | | |
|---|---|---|
| 2007/0229308 A1 | 10/2007 | Stalp et al. |
| 2018/0186367 A1 | 7/2018 | Kim et al. |
| 2020/0377012 A1* | 12/2020 | Saez ..................... G06V 40/25 |
| 2020/0398743 A1* | 12/2020 | Huber ................... G08G 1/166 |
| 2020/0410062 A1* | 12/2020 | O'Malley ............ G05D 1/0088 |
| 2021/0309248 A1* | 10/2021 | Choe ....................... G06N 3/04 |

OTHER PUBLICATIONS

Jeong et al., "Early Detection of Sudden Pedestrian Crossing for Safe Driving During Summer Nights", IEEE Transactions on Circuits and Systems for Video Technology, vol. 27, Issue 6, (Mar. 8, 2016), 13 pages.

* cited by examiner

METHOD, APPARATUS, AND COMPUTER PROGRAM PRODUCT FOR DYNAMIC DETECTION OF PEDESTRIAN ACTIVITY

TECHNOLOGICAL FIELD

An example embodiment relates generally to dynamic detection of pedestrian activity and, more particularly, to dynamic detection of pedestrian activity for use by vehicles.

BACKGROUND

Understanding pedestrian movement patterns can be helpful for a variety of use cases, including use by drivers of vehicles and particularly for autonomously and/or semi-autonomously operated vehicles. However, pedestrian-specific movement data is often difficult to determine and requires complete data models that require resource intensive computing in order to produce useful information. As such, pedestrian-specific movement data is not widely available and therefore use cases, use by autonomous and/or semi-autonomous vehicles, are not able to be optimized.

BRIEF SUMMARY

A method, apparatus, and computer program product are provided in accordance with an example embodiment in order to dynamically detect pedestrian activity. In an example embodiment, the method includes receiving one or more data objects from a vehicle, wherein each of the one or more data objects describe one or more attributes of a vehicle trip. The method may further include determining, using an image processing model, one or more pedestrian parameters based at least in part on the one or more data objects. The method may further include determining whether the one or more pedestrian parameters satisfy one or more pedestrian parameter thresholds. The method may further include in an instance the one or more pedestrian parameters do not satisfy one or more pedestrian parameter thresholds, causing one or more safety alert warnings to be provided to one or more other vehicles.

In some embodiments, the method further includes determining vehicle trip information. The method may further include assigning a pedestrian flow compartment of a pedestrian flow matrix to the vehicle based at least in part on the vehicle trip information, wherein (i) the pedestrian flow matrix comprises one or more pedestrian flow compartments and (ii) each pedestrian flow compartment is associated with one or more pedestrian parameter thresholds.

In some embodiments, the method further includes determining whether the one or more pedestrian parameters satisfy the one or more pedestrian parameter thresholds for the corresponding pedestrian flow compartment.

In some embodiments, the method further includes determining, using the pedestrian flow matrix, one or more associated pedestrian flow compartments of the pedestrian flow compartment corresponding to the vehicle. In some embodiments, the method further includes causing the safety alert warning to be provided to one or more other vehicles which correspond to the one or more associated pedestrian flow compartments. In some embodiments, the method further includes causing the safety alert warning to be provided via a cloud service is to one or more other vehicles.

In some embodiments, the method further includes selecting the pedestrian flow matrix from a plurality of candidate pedestrian flow matrices based at least in part on time information associated with the received one or more data objects.

In some embodiments, the one or more pedestrian flow compartments are divided based on at least one of zip code level, link level, or point of interest level. In some embodiments, the one or more data objects are formatted as json objects. In some embodiments, the one or more pedestrian parameters includes one or more of a pedestrian count or pedestrian density value.

In an example embodiment, an apparatus is configured with means for receiving one or more data objects from a vehicle, wherein each of the one or more data objects describe one or more attributes of a vehicle trip. The apparatus may further include means for determining, using an image processing model, one or more pedestrian parameters based at least in part on the one or more data objects. The apparatus may further include means for determining whether the one or more pedestrian parameters satisfy one or more pedestrian parameter thresholds. The apparatus may further include means for in an instance the one or more pedestrian parameters do not satisfy one or more pedestrian parameter thresholds, causing one or more safety alert warnings to be provided to one or more other vehicles.

In some embodiments, the apparatus may further include means for determining vehicle trip information. The apparatus may further include means for assigning a pedestrian flow compartment of a pedestrian flow matrix to the vehicle based at least in part on the vehicle trip information, wherein (i) the pedestrian flow matrix comprises one or more pedestrian flow compartments and (ii) each pedestrian flow compartment is associated with one or more pedestrian parameter thresholds.

In some embodiments, the apparatus may further include means for determining whether the one or more pedestrian parameters satisfy the one or more pedestrian parameter thresholds for the corresponding pedestrian flow compartment.

In some embodiments, the apparatus may further include means for determining, using the pedestrian flow matrix, one or more associated pedestrian flow compartments of the pedestrian flow compartment corresponding to the vehicle. In some embodiments, the apparatus may further include means for causing the safety alert warning to be provided to one or more other vehicles which correspond to the one or more associated pedestrian flow compartments. In some embodiments, the apparatus may further include means for causing the safety alert warning to be provided via a cloud service to one or more other vehicles.

In some embodiments, the apparatus further includes means for selecting the pedestrian flow matrix from a plurality of candidate pedestrian flow matrices based at least in part on time information associated with the received one or more data objects.

In some embodiments, the one or more pedestrian flow compartments are divided based on at least one of zip code level, link level, or point of interest level. In some embodiments, the one or more data objects are formatted as json objects. In some embodiments, the one or more pedestrian parameters includes one or more of a pedestrian count or pedestrian density value.

In an example embodiment, an apparatus includes at least one processor, and at least one memory including computer program code, the at least one memory and the computer program code configured to, with the at least one processor, cause the apparatus at least to receive one or more data objects from a vehicle, wherein each of the one or more data objects describe one or more attributes of a vehicle trip. The at least one memory and the computer program code may further be configured to, with the at least one processor, cause the apparatus to determine using an image processing model, one or more pedestrian parameters based at least in part on the one or more data objects. The at least one memory and the computer program code may further be configured to, with the at least one processor, cause the apparatus to determine whether the one or more pedestrian parameters satisfy one or more pedestrian parameter thresholds. The at least one memory and the computer program code may further be configured to, with the at least one processor, cause the apparatus to, in an instance the one or more pedestrian parameters do not satisfy one or more pedestrian parameter thresholds, cause a safety alert warning to be provided to one or more other vehicles.

In some embodiments, the at least one memory and the computer program code may further be configured to, with the at least one processor, cause the apparatus to determine vehicle trip information. In some embodiments, the at least one memory and the computer program code may further be configured to, with the at least one processor, cause the apparatus to assign a pedestrian flow compartment of a pedestrian flow matrix to the vehicle based at least in part on the vehicle trip information, wherein (i) the pedestrian flow matrix comprises one or more pedestrian flow compartments and (ii) each pedestrian flow compartment is associated with one or more pedestrian parameter thresholds.

In some embodiments, the at least one memory and the computer program code may further be configured to, with the at least one processor, cause the apparatus to determine whether the one or more pedestrian parameters satisfy the one or more pedestrian parameter thresholds for the corresponding pedestrian flow compartment.

In some embodiments, the at least one memory and the computer program code may further be configured to, with the at least one processor, cause the apparatus to determine, using the pedestrian flow matrix, one or more associated pedestrian flow compartments of the pedestrian flow compartment corresponding to the vehicle. In some embodiments, the at least one memory and the computer program code may further be configured to, with the at least one processor, cause the apparatus to cause the safety alert warning to be provided to one or more other vehicles which correspond to the one or more associated pedestrian flow compartments.

In some embodiments, the at least one memory and the computer program code may further be configured to, with the at least one processor, cause the apparatus to cause the safety alert warning to be provided via a cloud service is to one or more other vehicles.

In some embodiments, the at least one memory and the computer program code may further be configured to, with the at least one processor, cause the apparatus to select the pedestrian flow matrix from a plurality of candidate pedestrian flow matrices based at least in part on time information associated with the received one or more data objects.

In an example embodiment, a computer program product includes a computer program product comprising at least one non-transitory computer-readable storage medium having computer-executable program code portions stored therein, the computer-executable program code portions comprising program code instructions configured to receive one or more data objects from a vehicle, wherein each of the one or more data objects describe one or more attributes of a vehicle trip. The computer-executable program code portions comprising program code instructions may further be configured to determine using an image processing model, one or more pedestrian parameters based at least in part on the one or more data objects. The computer-executable program code portions comprising program code instructions may further be configured to determine whether the one or more pedestrian parameters satisfy one or more pedestrian parameter thresholds. The computer-executable program code portions comprising program code instructions may further be configured to, in an instance the one or more pedestrian parameters do not satisfy one or more pedestrian parameter thresholds, cause a safety alert warning to be provided to one or more other vehicles.

In some embodiments, the computer-executable program code portions comprising program code instructions may further be configured to determine vehicle trip information. In some embodiments, the computer-executable program code portions comprising program code instructions may further be configured to assign a pedestrian flow compartment of a pedestrian flow matrix to the vehicle based at least in part on the vehicle trip information, wherein (i) the pedestrian flow matrix comprises one or more pedestrian flow compartments and (ii) each pedestrian flow compartment is associated with one or more pedestrian parameter thresholds.

In some embodiments, the computer-executable program code portions comprising program code instructions may further be configured to determine whether the one or more pedestrian parameters satisfy the one or more pedestrian parameter thresholds for the corresponding pedestrian flow compartment.

In some embodiments, the computer-executable program code portions comprising program code instructions may further be configured to determine, using the pedestrian flow matrix, one or more associated pedestrian flow compartments of the pedestrian flow compartment corresponding to the vehicle. In some embodiments, the computer-executable program code portions comprising program code instructions may further be configured to cause the safety alert warning to be provided to one or more other vehicles which correspond to the one or more associated pedestrian flow compartments.

In some embodiments, the computer-executable program code portions comprising program code instructions may further be configured to cause the safety alert warning to be provided via a cloud service is to one or more other vehicles.

In some embodiments, the computer-executable program code portions comprising program code instructions may further be configured to select the pedestrian flow matrix from a plurality of candidate pedestrian flow matrices based at least in part on time information associated with the received one or more data objects.

In some embodiments, the one or more pedestrian flow compartments are divided based on at least one of zip code level, link level, or point of interest level. In some embodiments, the one or more data objects are formatted as json objects. In some embodiments, the one or more pedestrian parameters includes one or more of a pedestrian count or pedestrian density value.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
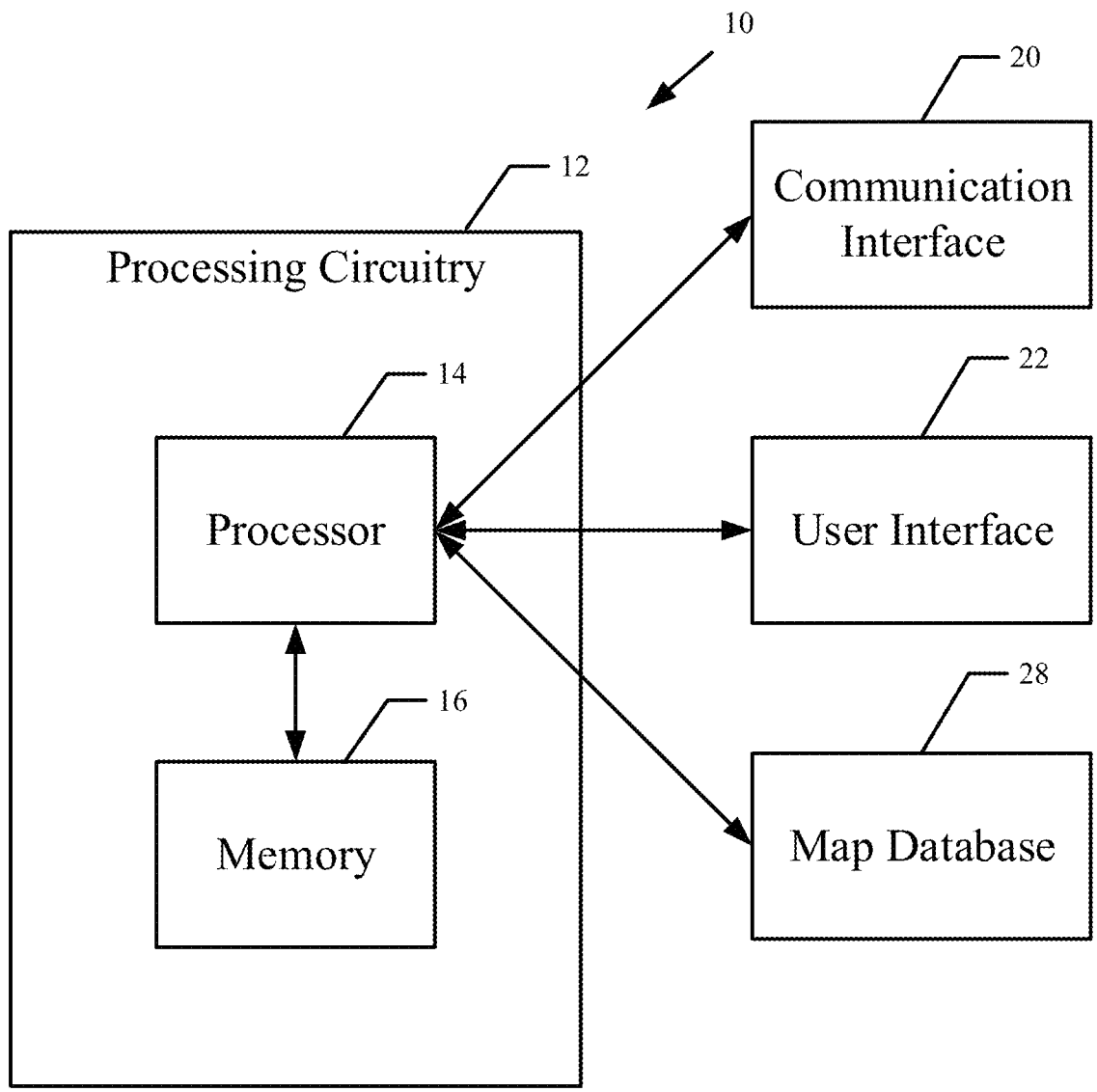
Figure 2:
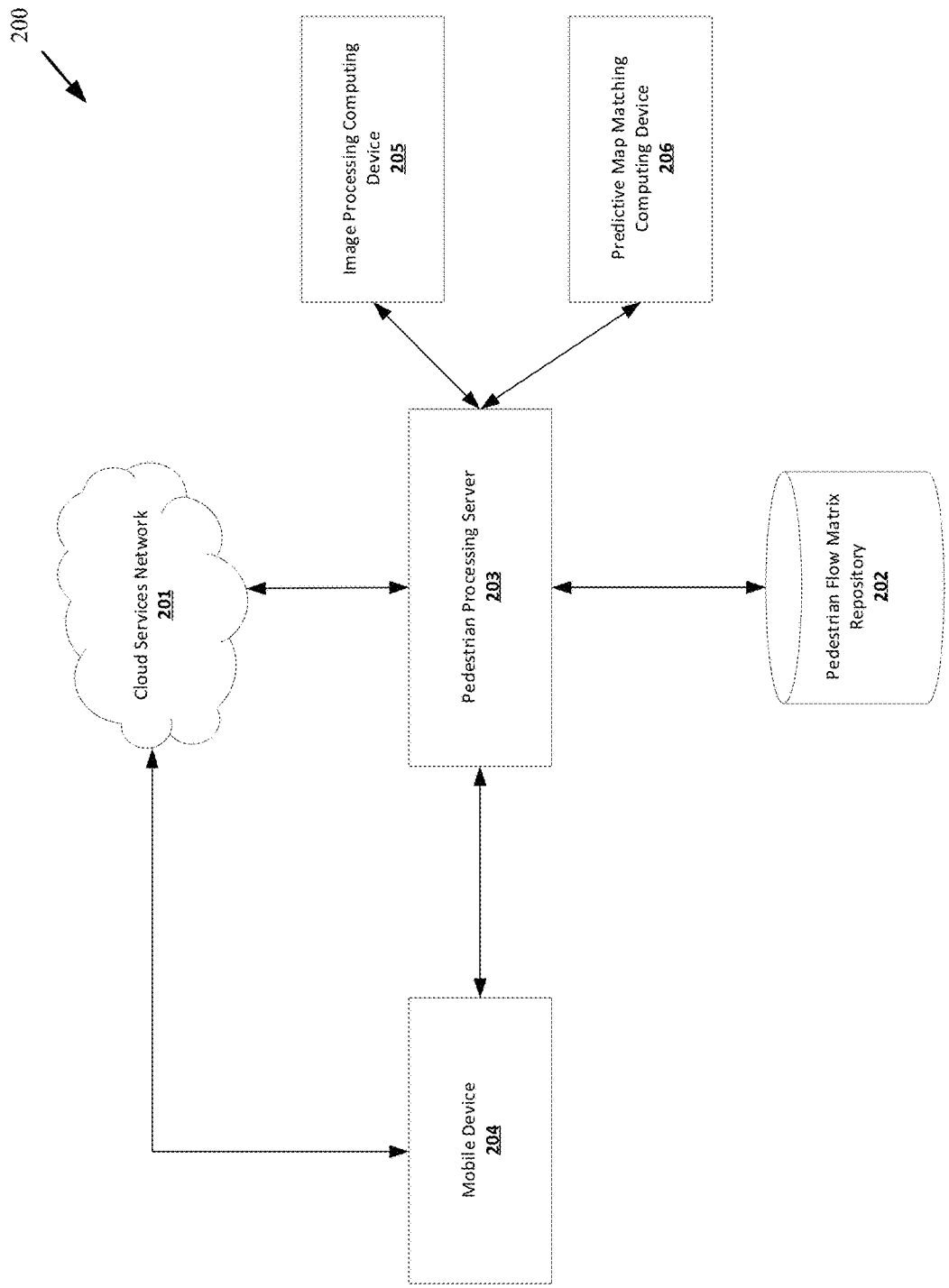
Figure 3:
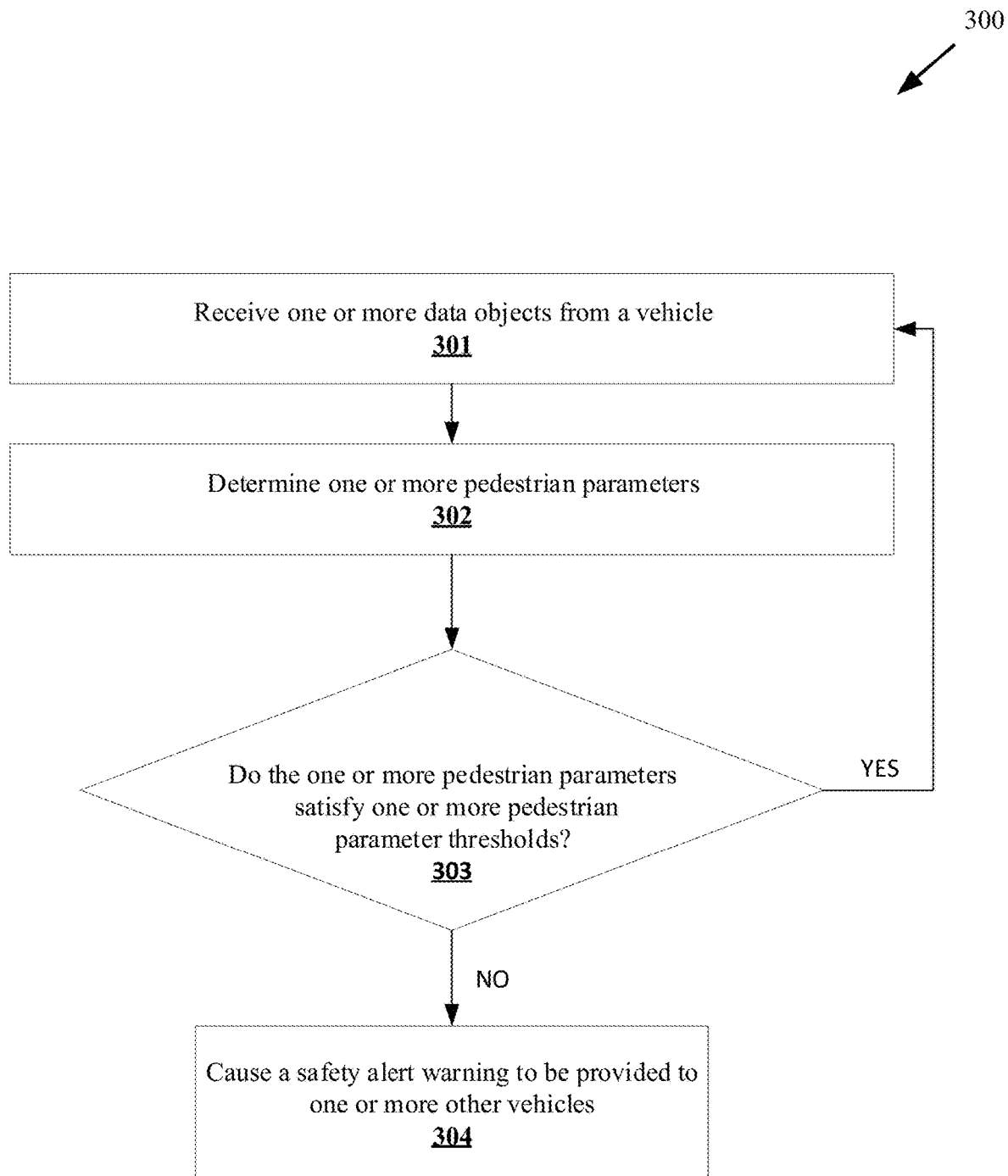
Figure 4:
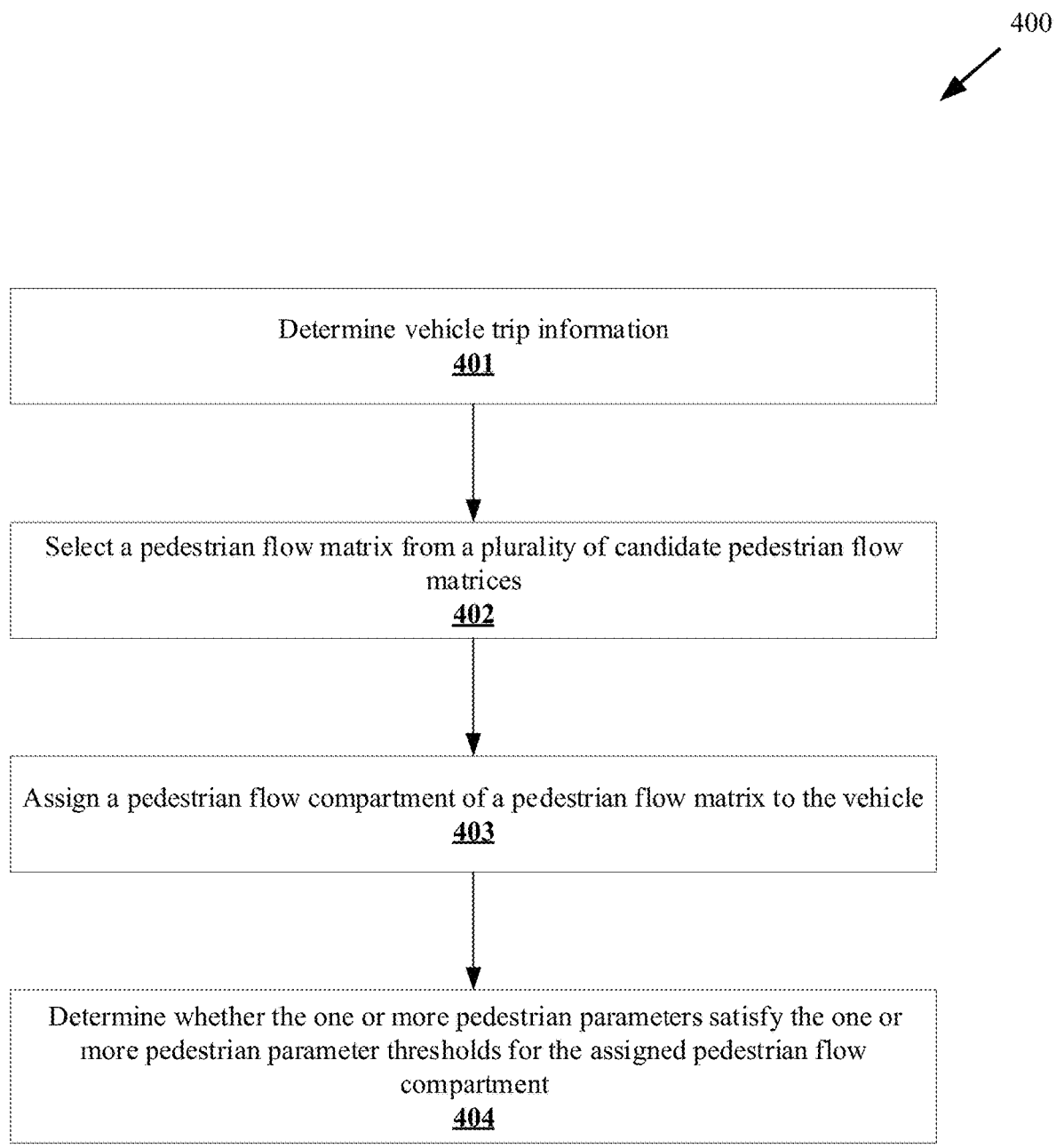
Figure 5A:
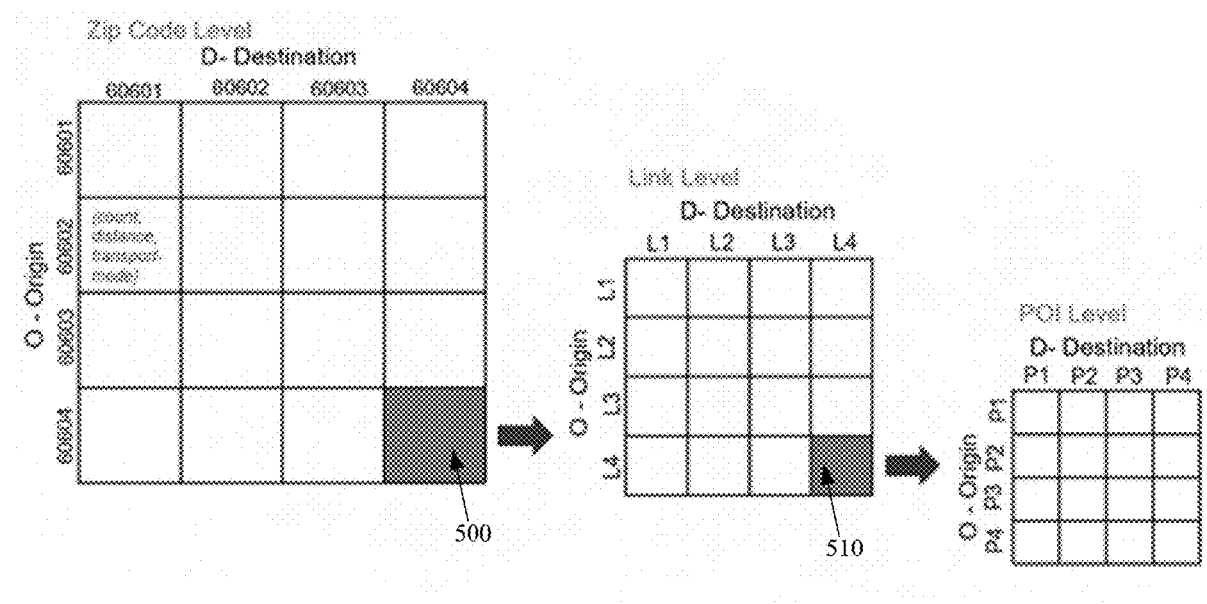
Figure 5B:
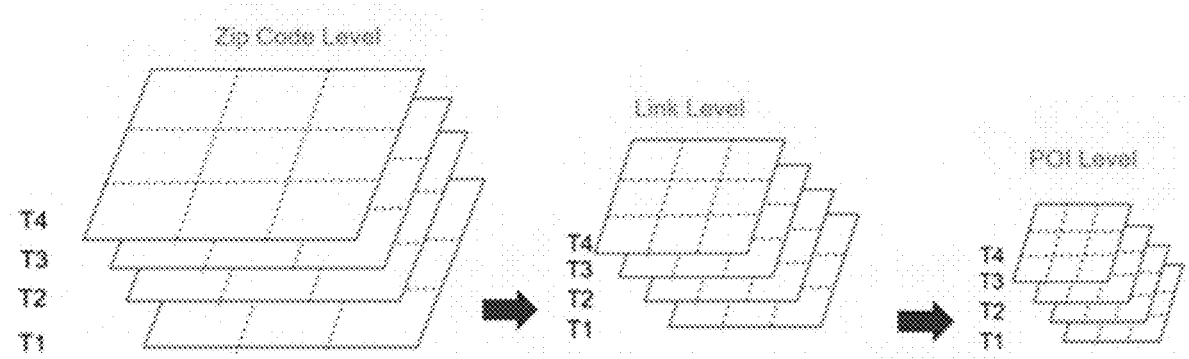

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a block diagram of an overview of a system that may be specifically configured for the dynamic detection of pedestrian activity in accordance with an example embodiment of the present disclosure;

FIG. 3 is a flowchart illustrating operations for causing a safety alert warning to be provided to one or more vehicles based on pedestrian activity in accordance with an example embodiment of the present disclosure;

FIG. 4 is a flowchart illustrating operations for using a pedestrian flow matrix for pedestrian activity detection in accordance with an example embodiment of the present disclosure; and FIGS. 5A-5B are example pedestrian flow matrices with different spaciotemporal dimensions in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. The term advertisement may be used to mean any information that may be provided to a pedestrian. Thus, use of any such terms should not be taken to limit the spirit and scope of embodiments of the present invention.

Currently, vehicles traveling on a road segment may have limited insight into activities occurring downstream the road segment, particularly if those activities are unplanned and/or unpredictable. For example, increased pedestrian traffic on or nearby a particular road segment may occur for any variety of reasons but may not be readily apparent until the vehicle is within the vicinity of the increased pedestrian traffic. While sensor systems, such as light detection and ranging (LIDAR) sensors, vision sensors, and/or the like may detect pedestrians within the vicinity of the vehicle, it would be advantageous for drivers of vehicles and/or autonomously or semi-autonomously operated vehicles to be made aware of the increased pedestrian traffic prior to arriving at the road segment section. In this way, the driver of the vehicle and/or the vehicle may take one or more actions based on the increased pedestrian traffic. For example, the driver and/or the vehicle may take a different route, switch autonomous vehicle operations to manual operations, operate at decreased speed conditions, and/or the like.

Various embodiments of the present disclosure address the above limitations by allowing for pedestrian travel patterns to be monitored and determined in real-time, such that the pedestrian activity may be provided to and used by vehicles and/or drivers. Various embodiments of the present disclosure allow for the identification of one or more pedestrian parameters upon receipt of one or more data objects from a vehicle. Furthermore, a determination may be made as to whether the one or more pedestrian parameters satisfy one or more pedestrian parameter thresholds. In an instance the one or more pedestrian parameters do not satisfy one or more pedestrian parameter thresholds, a safety warning may be provided to one or more other vehicles.

FIG. 1 is a schematic diagram of an example apparatus 10 configured for performing any of the operations in accordance with an example embodiment as described herein. Apparatus 10 may be embodied by or associated with any of a variety of computing devices that include or are otherwise associated with a device configured for detecting pedestrian activity. In other embodiments of the apparatus, the apparatus itself may be embodied or partially embodied as server or any other network computing device, a computing device onboard a vehicle, a navigation device, a mobile terminal, such as a personal digital assistant (PDA), mobile telephone, smart phone, personal navigation device, smart watch, tablet computer, camera or any combination of the aforementioned.

Optionally, the apparatus 10 may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device 16 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present disclosure while configured accordingly. Thus, for example, when the processor 14 is embodied as an ASIC, FPGA or the like, the processor may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor 14 may include, among other things, a clock, an arithmetic logic unit (ALU) and logic gates configured to support operation of the processor.

The apparatus 10 of an example embodiment may also include or otherwise be in communication with a user interface 22. The user interface 22 may include a touch screen display, a speaker, physical buttons, and/or other input/output mechanisms. In an example embodiment, the processor 14 may comprise user interface circuitry configured to control at least some functions of one or more input/output mechanisms. The processor 14 and/or user interface 22 comprising the processor may be configured to control one or more functions of one or more input/output mechanisms through computer program instructions (for example, software and/or firmware) stored on a memory accessible to the processor (for example, memory device 16, and/or the like). The user interface 22 may be embodied in the same housing as the processing circuitry. Alternatively, the user interface 22 may be separate from the processor circuitry 12.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques, such as Bluetooth. Additionally or alternatively, the communication interface 20 may be configured to communicate via cellular or other wireless protocols including Global System for Mobile Communications (GSM), such as but not limited to 4G, 5G, and Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired or wireless communications.

The apparatus 10 may have a mapping or navigation interface so as to use maps in order to carry out the operations discussed herein. In order to support a mapping application, the computing device may include or otherwise be in communication with a geographic map database 28, such as may be stored in memory 16 or is otherwise accessible to the processor, such as in map database 28. For example, the geographic map database 28 includes node data records, sidewalk segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or Global Positioning System (GPS) data associations (such as using known or future map matching or geo-coding techniques), for example. The map data may include information regarding sidewalks or other pedestrian paths including the historical number of pedestrians at a particular location or region at a particular time or within a particular time window. Some map data for sidewalks may be derived from road data corresponding to nearby road segments. For example, busy roads in some areas may have higher pedestrian traffic than less busy roads. Furthermore, other positioning technology may be used, such as electronic horizon sensors, radar, Light Detection and Ranging (LiDAR), ultrasonic and/or infrared sensors to collect information regarding sidewalks or other pedestrian paths including pedestrian usage thereof.

In addition to node data, path segment data, point of interest (POI) data, or the like, the map database 28 may also include cartographic data, routing data, and/or maneuvering data. According to some example embodiments, the path segment and node data records or other data that may represent pedestrian paths or areas. The node data may be end points corresponding to the respective links or segments of path segment data. The path data and the node data may represent a path network, such as used by pedestrians, bicycles, mobile robots, and/or other entities. Optionally, the map database may contain road segment data records may be links or segments representing roads, streets, or paths, as may be used in calculating a route or recorded route information for determination of one or more personalized routes in addition to or instead of the pedestrian walkway record data, for example. The road link data and the node data may represent a road network, such as used by vehicles, cars, trucks, buses, motorcycles, and/or other entities. The path segments and nodes data, as well as the road/link segments and nodes data, can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) also known as a context associated with the POI data records or other records of the map database.

The map database 28 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to mobile navigation, pedestrian navigation, or other types of navigation. While example embodiments described herein generally relate to pedestrian travel along walkways, example embodiments may be implemented for vehicle travel along roads, bicycle travel along bike paths, boat travel along maritime navigational routes, etc.

As mentioned above, the map database 28 may be a master geographic database stored or accessible on the server side. However, in alternate embodiments, a client-side map database may represent a compiled navigation database that may be used for navigation purposes.

FIG. 2 illustrates a communication diagram of an example embodiment of a system for implementing example embodiments described herein. The illustrated embodiment of FIG. 2 includes a mobile device 204, which may be, for example, a mobile phone, an in-vehicle navigation system, an ADAS, or the like, which may be, for example, the apparatus 10 of FIG. 1 and a pedestrian processing server 203 which may be embodied by, for example, the apparatus 10 of FIG. 1. Each of the mobile device 204 and pedestrian processing server 203 may be in communication with at least one of the other elements illustrated in FIG. 2 via a network, such as cloud service network 201. Cloud services network 201 may be any form of wireless or partially wireless network as will be described further below. In some embodiments, each mobile device 204 and the pedestrian processing server 203 may be in communication over an application, such as the Live Sense SDK application by HERE Global. Additional, different, or fewer components may be provided. For example, many mobile devices 204 may be in communication with the pedestrian processing server 203.

In some embodiments, the pedestrian processing server 203 may be configured to be in communication with an image processing computing device 205 which may be embodied by, for example, the apparatus 10 of FIG. 1. The image processing computing device 205 which may be embodied by, for example, the apparatus 10 of FIG. 1 may be configured to process one or more data objects using machine learning and/or artificial intelligence based computer vision algorithms to detect real-world objects. For example, the image processing computing device 205 may use one or more computer vision algorithms to detect one or more pedestrians present within the one or more data objects. The image processing computing device 205 may be further configured to determine one or more pedestrian parameters based at least in part on the number of detected pedestrians.

In some embodiments, the pedestrian processing server 203 may be configured to be in communication with a predictive map matching computing device 206 which may be, for example, the apparatus 10 of FIG. 1. The predictive map matching computing device 206 may be configured to process the one or more data objects that are provided, for example, by a vehicle, by a navigation system, etc. For example, in some embodiments, the predictive map matching computing device 206 may be configured to process the one or more data objects and determine lane localization information for the vehicle which obtained the one or more data objects. As such, based at least in part on lane localization information, the location of pedestrians may be determined. For example, the predictive map matching computing device 206 may be configured to determine that the vehicle is traveling on the right side of the road segment in the middle-most lane of the road segment pertaining to the right side of the road segment. In some embodiments, the predictive map matching computing device 206 may be configured to determine lane localization based at least in part on data object metadata associated with the one or more received data objects and/or information stored within the map database 28. For example, the predictive map matching computing device 206 may determine GPS coordinates based at least in part on data object metadata and extract one or more maps from the map database 28 which include the determined GPS coordinates. The extracted one or more maps may include road segment data, such as the number of lanes associated with a particular road segment corresponding to a set of GPS coordinates. As such, the predictive map matching computing device 206 may base the lane localization information on the number of lanes for the road segment.

In some embodiments, the pedestrian processing server 203 may be configured to be in communication with a pedestrian flow matrix repository 202. The pedestrian flow matrix repository 202 may be a storage repository configured to store one or more pedestrian flow matrices. The pedestrian flow matrix repository may also store pedestrian flow matrix metadata with each pedestrian flow matrix such that the pedestrian processing server 203 may use the pedestrian flow matrix metadata to aid in the selection of a particular pedestrian flow matrix from amongst one or more candidate pedestrian flow matrices stored in the pedestrian flow matrix repository 202.

Referring now to FIG. 3, the operations are illustrated that are performed, such as by the apparatus 10 of FIG. 1 embodied by a computing device, such as pedestrian processing server 203, in accordance with an example embodiment to cause a safety alert warning to be provided to one or more vehicles based on pedestrian activity.

At block 301 of FIG. 3, the apparatus 10 embodied by a computing device, such as pedestrian processing server 203 includes means, such as the processor 14, the communication interface 20, memory 16 or the like, for receiving one or more data objects from a vehicle. In some embodiments, the pedestrian processing server 203 may receive one or more data objects from one or more mobile devices, such as mobile device 204, such as a vehicle configured with one or more onboard sensors. In some embodiments, the vehicle may be configured with an application which allows for the capture and/or provision of such data objects, such as the HERE Global Live Sense SDK application. In some embodiments, the one or more received data objects may be one or more images as obtained using one or more sensors onboard the vehicle, such as one or more onboard cameras. In some embodiments, the one or more data objects may be formatted as json objects.

In some embodiments, the one or more data objects may additionally include data object metadata. The data object metadata may include spatiotemporal information pertaining to where the data objects were generated and time information, such as a timestamp, for the data object generation. For example, the one or more data objects may include the time and location (e.g., derived from GPS data) for the origin of a vehicle trip, the destination of a vehicle trip, and/or one or more sublocation points of a vehicle trip between the origin and the destination (such as at the one or more points at which information is collected regarding pedestrian traffic, such as when an image of the pedestrian traffic is captured).

Additionally or alternatively, in some embodiments, the pedestrian processing server 203 may receive the one or more data objects from one or more third party source data providers. For example, smart cities may be configured to collect data relating to pedestrian movement. In some embodiments, one or more data objects may additionally or alternatively be received from mobile devices, public transportation trackers, ride-sharing trackers, street cameras, satellite images, or the like.

At block 302 of FIG. 3, the apparatus 10 embodied by a computing device, such as pedestrian processing server 203 includes means, such as the processor 14, the communication interface 20, memory 16 or the like, for determining one or more pedestrian parameters. In some embodiments, upon receipt of the one or more data objects, the pedestrian processing server 203 may be configured to process the data objects to determine the one or more pedestrian parameters, such as by using the image processing computing device 205. The pedestrian processing server 203 may provide the one or more data objects to the image processing computing device 205, which may be configured to use machine learning and/or artificial intelligence based computer vision algorithms to detect real-world objects. For example, the image processing computing device 205 may use one or more computer vision algorithms to detect one or more pedestrians present within the one or more data objects. The image processing computing device 205 may be further configured to determine one or more pedestrian parameters based at least in part on the number of detected pedestrians. In some embodiments, the one or more pedestrian parameters may include a pedestrian count, pedestrian density, and/or the like. A pedestrian count may be indicative of the number of detected pedestrians within the one or more data objects which pertain to the same location. In some embodiments, the location of the pedestrians may be determined with respect to a particular side of the street, particular street corner, and/or the like. A pedestrian density may be indicative of the number of detected pedestrians within a predetermined area (e.g., pedestrians per square foot).

In some embodiments, the one or more data objects may additionally and/or alternatively be processed using the predictive map matching computing device 206. The predictive map matching computing device 206 may be configured to process the one or more data objects. For example, in some embodiments, the predictive map matching computing device 206 may be configured to process the one or more data objects and determine lane localization information for the vehicle which obtained the one or more data objects. The location of pedestrians may then be determined based at least in part on lane localization information. For example, the predictive map matching computing device 206 may be configured to determine that the vehicle is traveling in the middle-most lane of the road segment pertaining to the north-bound side of the road segment. In some embodiments, the predictive map matching computing device 206 may be configured to determine lane localization information based at least in part on data object metadata associated with the one or more received data objects and/or information stored within the map database 28. For example, the predictive map matching computing device 206 may determine GPS coordinates based at least in part on data object metadata and extract one or more maps from the map database 28 which include the determined GPS coordinates. The extracted one or more maps may include road segment data, such as the number of lanes associated with a particular road segment corresponding to a set of GPS coordinates. As such, the predictive map matching computing device 206 may base the lane localization information on the number of lanes for the road segment. Once the lane localization information for the vehicle has been determined, the location of the pedestrians relative to the road segment may also be determined. For example, if pedestrians are detected to the right of the vehicle and lane localization information determines the vehicle is traveling in the right-most lane of the north-bound side of the road segment, the pedestrians may be determined to be on right side of the north-bound side of the road segment.

At block 303 of FIG. 3, the apparatus 10 embodied by a computing device, such as pedestrian processing server 203 includes means, such as the processor 14, memory 16 or the like, for determining whether the one or more pedestrian parameters satisfy one or more pedestrian thresholds. Once the one or more pedestrian parameters have been determined, the pedestrian parameters may be compared to one or more pedestrian parameter thresholds. The pedestrian parameter thresholds may be based at least in part on the location of the vehicle and/or the timestamp of the one or more data objects. In some embodiments, the one or more pedestrian parameter thresholds may also be based at least in part on one or more additional factors such as environmental factors including weather (e.g., rain, snow, sleet, etc.), vehicle factors including vehicle type (e.g., car, truck, bus, tractor trailer, etc.), and/or road segment factors including road segment speed limit, road segment hazards (e.g., ongoing construction, narrow road, prone to icy conditions, etc.). For example, a given location may be associated with a pedestrian parameter threshold corresponding to a timestamp of 6:00 am, which may have a value of 4 pedestrians per square foot and also be associated with a pedestrian parameter threshold corresponding to a timestamp of 1:00 pm, which may have a value of 10 pedestrians per square foot. As such, a pedestrian parameter which describes 6 pedestrians per square foot would not satisfy the pedestrian parameter threshold corresponding to the timestamp of 6:00 am but would satisfy the pedestrian parameter threshold corresponding to the timestamp of 1:00 pm. In an instance the one or more pedestrian parameters satisfy the one or more pedestrian parameter thresholds, the pedestrian processing server 203 may return to block 301 such that it may process new data objects received from vehicles and thus continues to monitor for unexpected pedestrian traffic. In an instance the one or more pedestrian parameters do not satisfy the one or more pedestrian parameter thresholds, the pedestrian processing server 203 may proceed to block 304.

In some embodiments, block 303 may be performed in accordance with the various steps/operations of the process 400 depicted in FIG. 4, which is a flowchart diagram of an example process for using a pedestrian flow matrix for pedestrian activity detection.

At block 401 of FIG. 4, the apparatus 10 embodied by a computing device, such as pedestrian processing server 203 includes means, such as the processor 14 or the like, for determining a vehicle trip information. The vehicle trip information may be determined in various ways. For example, vehicle trip information may be provided within the data object metadata. For example, the data object metadata may include an origin point, a destination point, and/or one or more sublocation points along a probe path, which is formed based at least in part on the origin point and the destination point. In some embodiments, the probe-path may include both an origin and destination, along with the route from the origin to the destination. Furthermore, the data object metadata may include spatiotemporal information pertaining to where the data objects were generated and time information, such as a timestamp, for the data object generation.

At block 402 of FIG. 4, the apparatus 10 embodied by a computing device, such as pedestrian processing server 203 includes means, such as the processor 14, memory 16, or the like, for selecting a pedestrian flow matrix from a plurality of candidate pedestrian flow matrices. In some embodiments, the selected pedestrian flow matrix may be used to provide the one or more pedestrian parameter thresholds. In some embodiments, a plurality of candidate pedestrian flow matrices may be stored in pedestrian flow matrix repository 202. The pedestrian processing server 203 may select a pedestrian flow matrix based at least in part on the determined vehicle trip information. For example, the pedestrian processing server 203 may select the pedestrian flow matrix which corresponds at least one of an origin point, destination point, and/or sublocation point of the vehicle trip as indicated by the probe path. In some embodiments, the pedestrian processing server 203 may additionally or alternatively select the pedestrian flow matrix based at least in part on a timestamp associated with each of the one or more data objects. For example, as will be described below, each candidate pedestrian flow matrix may be associated with a particular location or region and a particular time range such that the pedestrian processing server 203 may select the pedestrian flow matrix corresponding to the time range within which the time stamp of the one or more data objects falls.

In some embodiments, a pedestrian flow matrix is a data structure configured with one or more pedestrian flow compartments which are each associated with one or more pedestrian parameters. For example, a pedestrian flow matrix may include pedestrian count and/or pedestrian density (e.g., the amount of people moving from one area to another), frequency (e.g., the amount of time a specific identifier for a person is seen), distance (e.g., from origin to destination, may be displacement distance, journey distance, and/or travel-time), and the mode of transportation (e.g., pedestrians or otherwise). In some embodiments, the pedestrian flow compartments may be divided based on at least one of zip code level, link level, or point of interest level.

In various embodiments, the division size of the compartments (e.g., zip code level, link level, or point of interest level) may vary based on the use case (e.g., may vary depending on the city being implemented). In an example embodiment, an operational example of a pedestrian flow matrix is shown in FIG. 5A. In FIG. 5A, a pedestrian flow compartment may be defined with the origin location and destination location of a trip. For example, for a zip code level compartment of FIG. 5A, there are four compartments for each origin zip code based on the destination zip code (e.g., there is a compartment for starting in zip code 60601 and ending zip codes 60601, 60602, 60603, and 60604).

In various embodiments, a pedestrian flow compartment may be further divided. For example, as shown in FIG. 5A, shaded pedestrian flow compartment 500 of the zip code level matrix may be divided into the link level matrix, and subsequently shaded pedestrian flow compartment 510 of the link level matrix may be divided into a POI level matrix. In some embodiments, the zip-code level may be larger than the link level, and the link level may be larger than the POI level. For example, the zip-code may be an area in a city (e.g., defined by zip codes or otherwise within a city), the link-level may be a linear stretch of a road segment within the area of the city, and the POI level may be a specific point on or region along the road segment (e.g., the location of a retail store).

In some embodiments, a given pedestrian flow matrix may be defined for a predetermined time range. For example, a first pedestrian flow matrix may be configured for morning, while a second pedestrian flow matrix may be defined for the evening. In some embodiments, multiple pedestrian flow matrices may be generated for the same area over different periods of times, as shown in the operation example depicted in FIG. 5B. For example, there may be four Zip Code Level pedestrian flow matrices with the same dimensions for four different times (e.g., T1-T4).

In some embodiments, each pedestrian flow compartment may be associated with one or more pedestrian parameter thresholds. The one or more pedestrian parameter thresholds may be based at least in part on historical observed, collected, and analyzed data objects which correspond to the particular pedestrian flow compartment. For example, a pedestrian flow compartment may be associated with a pedestrian count threshold of 20 and a pedestrian flow count threshold of 50, indicating pedestrian counts between 20-50 are regularly observed for the particular pedestrian flow compartment.

At block 403 of FIG. 4, the apparatus 10 embodied by a computing device, such as pedestrian processing server 203 includes means, such as the processor 14, or the like, for assigning a pedestrian flow compartment of the selected pedestrian flow matrix to the vehicle. In some embodiments, the pedestrian flow compartment may be assigned based at least in part on the vehicle trip information. For example, the pedestrian processing server 203 may assign the pedestrian flow compartment which corresponds to the vehicle origin zip code and destination zip code. As another example, a pedestrian trip that includes an origin location, a destination location, and a time range that is within a range of locations and time of a pedestrian flow matrix may be further assigned to a given pedestrian flow compartment within the given pedestrian flow compartment. In some embodiments, a given pedestrian trip may be distributed to a plurality of pedestrian flow matrices (e.g., some pedestrian flow matrices may overlap in location range). In some embodiments, one or more pedestrian trips of the travel data may be outside of the location range of all of the pedestrian flow matrices.

For example, the travel data received may include data for a larger area than that encompassed by any and all of the generated pedestrian flow matrices.

At block 404 of FIG. 4, the apparatus 10 embodied by a computing device, such as pedestrian processing server 203 includes means, such as the processor 14, or the like, for determining whether the one or more pedestrian parameters satisfy the one or more pedestrian parameter thresholds for the assigned pedestrian flow compartment. For example, a pedestrian flow compartment may be associated with a pedestrian count threshold of 20 and a pedestrian flow count threshold of 50, indicating pedestrian counts between 20-50 are regularly observed for the particular pedestrian flow compartment. If a pedestrian count of 30 is determined (i.e. as accomplished at block 302 of FIG. 3), the one or more pedestrian count thresholds may be satisfied. As another example, if a pedestrian count of 70 is determined, the one or more pedestrian count thresholds may not be satisfied. If the one or more pedestrian parameters do not satisfy the one or more pedestrian parameter thresholds assigned to the pedestrian flow compartment, this may indicate unusual and/or unexpected pedestrian activity within the corresponding location.

Returning now to FIG. 3, at block 304 of FIG. 3, the apparatus 10 embodied by a computing device, such as pedestrian processing server 203 includes means, such as the processor 14, communication interface 20, or the like, for causing one or more safety alert warnings to be provided to one or more other vehicles in an instance the one or more pedestrian parameters do not satisfy the one or more parameter thresholds. In some embodiments, the pedestrian processing server 203 may generate one or more safety alert warnings indicative that unexpected pedestrian traffic has been detected. In some embodiments, the one or more safety alert warnings may further indicate the location where unexpected pedestrian traffic was detected. The one or more generated safety alert warning may then be provided to one or more other vehicles, such as by using cloud services network 201.

In some embodiments, the pedestrian processing server 203 may determine one or more associated pedestrian flow compartments which correspond to the vehicle which provided the one or more data objects and/or data object metadata or about which the one or more data objects and/or the data object metadata relate, such as in an instance in which the data object(s) and/or data object metadata are provided by a database or by another computing device. For example, the one or more associated pedestrian flow compartments may include pedestrian flow compartments which correspond to the same origin zip code, destination zip code, and/or one or more sublocation zip codes. The pedestrian processing server 203 may then cause the one or more safety alert warnings to be provided the one or more vehicles which correspond to the one or more associated pedestrian flow compartments.

As such, the one or more vehicles which receive the safety alert warning may take one or more actions based on the received safety alert warnings. For example, the driver of a vehicle which receives the safety alert warning may avoid the area with increased pedestrian traffic or proactively choose to take additional precautions such as slowing the vehicle speed, switching to a fully-manual operation mode, and/or the like. In some embodiments, vehicles which are autonomously and/or semi-autonomously operated may also take precautionary actions, such as slowing the vehicle speed, providing a notification to the driver advising the driver to operate the vehicle in a manual mode throughout the increased pedestrian traffic area, providing a notification to the driver indicating that the driver should change the route of the vehicle and potentially providing information regarding an alternative route and/or the like.

FIGS. 3 and 4 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for dynamically detecting pedestrian activity, the method comprising:
   receiving one or more data objects from a vehicle, wherein each of the one or more data objects describe one or more attributes of a vehicle trip;
   determining, using an image processing model, one or more pedestrian parameters based at least in part on the one or more data objects;
   determining whether the one or more pedestrian parameters satisfy one or more pedestrian parameter thresholds;
   determining vehicle trip information, wherein a pedestrian flow matrix for a predetermined time range is assigned to the vehicle based at least in part on the vehicle trip information, wherein (i) the pedestrian flow matrix comprises one or more pedestrian flow compartments and (ii) each pedestrian flow compartment is divided at the zip code level, link level, and/or point of interest level and each pedestrian flow compartment is associated with one or more pedestrian parameter thresholds; and
   in an instance the one or more pedestrian parameters do not satisfy one or more pedestrian parameter thresholds, causing one or more safety alert warnings to be provided to one or more other vehicles.

2. The method of claim 1, wherein determining whether the one or more pedestrian parameters satisfy one or more pedestrian parameter thresholds further comprises determining whether the one or more pedestrian parameters satisfy the one or more pedestrian parameter thresholds for the corresponding pedestrian flow compartment.

3. The method of claim 1, wherein causing the one or more safety alert warnings to be provided to one or more other vehicles further comprises:
   determining, using the pedestrian flow matrix, one or more associated pedestrian flow compartments of the pedestrian flow compartment corresponding to the vehicle; and
   causing the one or more safety alert warnings to be provided to one or more other vehicles which correspond to the one or more associated pedestrian flow compartments.

4. The method of claim 1, wherein assigning the pedestrian flow compartment of a pedestrian flow matrix further comprises selecting the pedestrian flow matrix from a plurality of candidate pedestrian flow matrices based at least in part on a timestamp associated with the received one or more data objects.

5. The method of claim 1, wherein causing the safety alert warning to be provided comprises causing the safety alert warning to be provided via a cloud service is to one or more other vehicles.

6. The method of claim 1, wherein the one or more pedestrian parameters includes one or more of a pedestrian count or pedestrian density value.

7. An apparatus comprising:
   at least one processor; and
   at least one memory including computer program code,
   the at least one memory and the computer program code configured to, with the at least one processor, cause the apparatus at least to:
      receive one or more data objects from a vehicle, wherein each of the one or more data objects describe lane localization information of a vehicle trip;
      determine using an image processing model, one or more pedestrian parameters based at least in part on the one or more data objects;
      determine whether the one or more pedestrian parameters satisfy one or more pedestrian parameter thresholds;
      determine vehicle trip information, wherein a pedestrian flow matrix for a predetermined time range is assigned to the vehicle based at least in part on the vehicle trip information, wherein (i) the pedestrian flow matrix comprises one or more pedestrian flow compartments and (ii) each pedestrian flow compartment is divided at the zip code level, link level, and/or point of interest level and each pedestrian flow compartment is associated with one or more pedestrian parameter thresholds; and
      in an instance the one or more pedestrian parameters do not satisfy one or more pedestrian parameter thresholds, cause one or more safety alert warnings to be provided to one or more other vehicles.

8. The apparatus of claim 7, wherein the at least one memory and the computer program code are configured to, with the at least one processor, cause the apparatus to determine whether the one or more pedestrian parameters satisfy one or more pedestrian parameter thresholds by determining whether the one or more pedestrian parameters satisfy the one or more pedestrian parameter thresholds for the corresponding pedestrian flow compartment.

9. The apparatus of claim 7, wherein the at least one memory and the computer program code are further configured to, when causing the safety alert warning to be provided to one or more other vehicles, with the at least one processor, cause the apparatus to:
   determine, using the pedestrian flow matrix, one or more associated pedestrian flow compartments of the pedestrian flow compartment corresponding to the vehicle; and
   cause the safety alert warning to be provided to one or more other vehicles which correspond to the one or more associated pedestrian flow compartments.

10. The apparatus of claim 7, wherein the at least one memory and the computer program code are configured to, with the at least one processor, cause the apparatus to assign the pedestrian flow compartment of a pedestrian flow matrix by selecting the pedestrian flow matrix from a plurality of candidate pedestrian flow matrices based at least in part on a timestamp associated with the received one or more data objects.

11. The apparatus of claim 7, wherein the at least one memory and the computer program code are configured to, with the at least one processor, cause the apparatus to cause the safety alert warning to be provided by causing the safety alert warning to be provided via a cloud service is to one or more other vehicles.

12. The apparatus of claim 7, wherein the one or more pedestrian parameters includes one or more of a pedestrian count or pedestrian density value.

\* \* \* \* \*